March 29, 1966  P. C. BRENEGAN  3,242,593
GAM 72 SIMULATOR
Filed Feb. 13, 1964
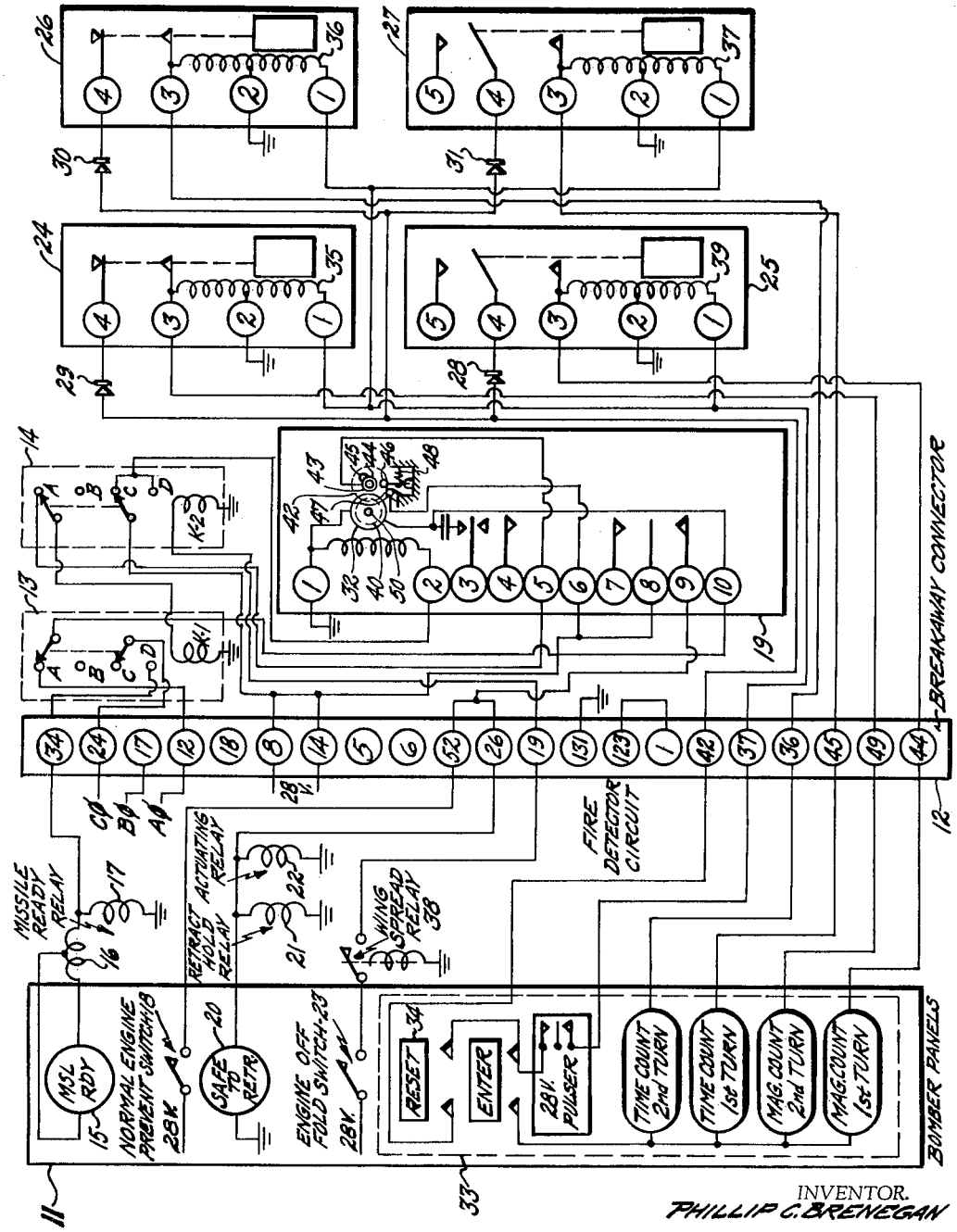
INVENTOR.
PHILLIP C. BRENEGAN
BY
ATTORNEYS 3,242,593
GAM 72 SIMULATOR
Phillip C. Brenegan, Rome, N.Y., assignor to the United States of America as represented by the Secretary of the Air Force
Filed Feb. 13, 1964, Ser. No. 344,796
4 Claims. (Cl. 35—12)

The invention described herein may be manufactured and used by or for the United States Government for governmental purposes without payment to me of any royalty thereon.

This invention relates to apparatus for simulating the launching of rockets or other self-propelled missiles from moving aircraft, and more particularly, to a GAM 72 Simulator for simulating the procedure before firing of the GAM 72 missile.

In recent years, guided missiles launched from aircraft have come to play an important role in national defense. In the course of development of guided missiles, a need has arisen for an economical and reusable exercise and test vehicle for the training and familiarization of pilots who are required to fire it. Realistic presentation of the procedures before firing of a missile consistant with safety of the student and aircraft is very valuable in the training of pilots. The GAM 72 Simulator was designed to serve the purpose as a training device and as test equipment for the GAM 72 launch gear and associated aircraft equipment.

The general purpose of this invention, therefore, is to provide a non-propulsive aircraft test and exercise vehicle capable of duplicating performance characteristics of the tactical missile simulated in regard to pre-launch procedure, and which simultaneously performs the function of a training simulator and a trouble-shooting device. To attain these features, the present invention contemplates a novel arrangement of electronic components mounted in an aluminum case, the components being wired in such a manner as to effectively reproduce the operation of the GAM 72 missile while installed in the aircraft, simulating: engine start, alternator output, proper eleven positioning through a missile ready loop; a fire detection through a fire detect loop; missile programming through a programming loop; engine shutdown, wings folded, alternator power off, and engine cool through an engine-off fold loop; and a bypass loop for bypassing the circuitry in the event of a malfunction.

It is, therefore, one object of the present invention to provide for the safe training of pilots in simulating the procedure before firing of the GAM 72 missile.

Another object is to provide a test vehicle which accurately and realistically simulates the reference propulsive missile in a simple and economical manner.

Still another object is to provide an effective test and trouble-shooting device.

These and other objects, features, and advantages of this invention will become more apparent from the following description taken in connection with the illustrative embodiments depicted in the accompanying drawing.

The appended figure is an electrical schematic of the wiring of the electronic components of the simulator.

Referring now to the drawing, the wiring schematic shows the connections from the panel board 11 of the bomber through breakaway connector 12 to various electrical components in the simulator. Missile ready lamp 15 is connected to missile ready relay coils 16 and 17 which are connected to pin 34 of connector 12. Pin 34 is connected to contact D of relay 13. Normal engine prevent switch 18 is connected to a 28-volt D.C. source; the other side of switch 18 is connected to pin 52 of the connector, which is also connected to pin 26 of the connector and also to pin 9 of motor panel 19. Safe to retract lamp 20 is connected to retract hold relay 21 and accessory relay 22, and is also connected to pin 26 of connector 12. D.C. pulser 33 is connected to pins 42, 37, 36, 45, 49, and 44 of connector 12; pin 42 of connector 12 is connected through diodes 28, 29, 30, and 31 to pin 4 of counters 25, 24, 26 and 27, respectively. Pin 37 of connector 12 is connected to pin 1 of the same counters; pin 36 of the connector is connected to pin 3 of counter 26, pin 46 to pin 3 of counter 27, pin 29 to pin 3 of counter 24, and pin 44 to pin 3 of counter 25.

The operation of the simulator is as follows: with power on and the launch selector on the designated missile, the launch gear tracks extend and the carriage starts down and stops at the end of the tracks. When the carriage stops, "A" phase, 115 volts A.C., 400 cycle per second power is applied to pin 12 of breakaway connector 12 through the normally closed contact A of relay 13 to pin 10 on motor panel 19 to timing motor 32, thereby starting the motor; 28 volts D.C. power is applied to pin 8 of connector 12 through the closed contact C of relay 14 to pin 2 of motor panel 19, which is connected to the clutch of timing motor 32; this engages timing gear 40 with the motor, and starts the gear turning about shaft 50; gear 40 in turn drives gear 42, which is rigidly mounted on the same shaft as cam 43, so that cam 43 also rotates with gear 42; 50 seconds after the clutch is engaged, contact 45 of cam 43 engages the pivoted contact 46, causing contact 46 to pivot and engage fixed contact 47 which is connected to pin 6 of motor panel 19; since 28 volts D.C. is applied through pin 5 of motor panel 19 through slip ring 44, which is electrically connected to cam 43 and contact 45, a closed circuit is caused to exist between pins 5 and 6 of motor panel 19, thereby applying 28 volts D.C. through closed contact A of relay 14 to relay coil K–1, causing coil K–1 to energize; "C" phase, 115 volts, 400 cycle power, applied to pin 24 of connector 12, is then applied through the now closed contact D of relay 13 to pin 34 of connector 12 to the missile ready relays 16 and 17 to missile ready lamp 15 on bomber panel 11, thus lighting the lamp. The energizing of coil K–1 also interrupts the power application to pin 10 of motor panel 19, thus stopping the motor. Spring 48 is used to return contact 46 into its initial position for the next cycle of operation. This procedure simulates engine start, alternator output, and eleven positioning through a missile ready loop.

To simulate engine-off fold, "engine-off fold" switch 23 on bomber panel 11 is closed, thereby applying 28 volts D.C. through the closed wing spread relay switch 38, to pin 19 of connector 12, which is then applied to coil K–2 of relay 14, energizing relay 14 and thereby de-energizing coil K–1 of relay 13; this allows 115 volts A.C. of "A" phase power to be applied through pin 12 of connector 12 through contact A of relay 13 to pin 10 of panel 19 to motor 32; 28 volts D.C. is also applied through contact C of relay 14 to pin 2 of panel 19 to the clutch of the motor, thus starting the timing function; after a time delay, pins 8 and 9 on motor panel 19 close in a manner as described in the preceding paragraph, applying 28 volts D.C. to pin 26 of connector 12, which is then applied to lamp 20, illuminating the "safe to retract" lamp on the bomber panel.

In the event of a component failure, "normal engine prevent" switch 18 on bomber panel 11 is closed, applying 28 volts D.C. to pins 52 and 26 of connector 12 to illuminate "safe to retract" lamp 20 on the bomber panel, and also energizing "retract hold" relay 21 in order that the missile simulator can be retracted.

The programmer loop is pulsed with D.C. pulser 33 from the aircraft, driving simulator counters 24, 25, 26, and 27 for as many steps or counts as is entered on the carrier aircraft panel. When the carrier aircraft counters count to zero, the circuit opens and therefore stops. It cannot be pulsed further until reset button 34 is depressed. This applies power to the other side of windings 39, 35, 36, and 37 in the simulator and pulses them on to zero, repositioning the counters to the original position. This simulates programming of the missile.

The simulator has many novel uses. When in flight, if a missile or launch gear malfunctions prior to launch or during engine shutdown, the missile would be jettisoned because of the inability to retract it back into the carrier aircraft. With this device installed, the aircraft could land with the launch gear extended because of the difference in size of the missile and GAM Simulator.

The bypass circuitry also allows a safe to retract indication by bypassing the components in the simulator in case of a malfunction within the simulator.

As a test device, ignition indicators and meters may be used for various readings for pin-pointing the malfunction at the aircraft, using the aircraft panels, relay boxes, launch gear, and power. The unit may easily be modified or changed as different modifications of the missile alter its operating characteristics.

What I claim as new and desire to secure by Letters Patent of the United States is:

1. A training device for simulating the launching procedure of an aircraft-mounted missile launching assembly including launch-triggering release mechanism comprising: in combination with a release-controlling cam and cam-operated switch mechanism and an electric motor driving said cam, a missile housing containing electrical switching means for the application of direct current power to said assembly, second electrical switching means for the application of operating power to the missile to be launched, a time-delay device actuated by said second electrical switching means, said time-delay device including a circuit controlling energization of said electric motor, programming means controlling missile launching sequence, first indicator means actuated by said time-delay device to indicate firing readiness of a missile, and second indicator means actuated by said time-delay device to simulate a missile retracting condition, and simultaneously to deenergize said electric motor.

2. The combination of claim 1, and in addition, manual switching means to actuate said time-delay device to actuate said second indicator means to simulate a missile retracting condition.

3. The combination of claim 2 wherein the electrical switching means comprise a relay for actuating a switch.

4. The combination of claim 3 wherein the programming means comprise pulse means within the aircraft to actuate counter means within the housing.

No references cited.

EUGENE R. CAPOZIO, *Primary Examiner.*